United States Patent
Watanabe (10) Patent No.: US 10,003,744 B2
(45) Date of Patent: Jun. 19, 2018

(54) SOLID-STATE IMAGE PICKUP ELEMENT, IMAGE PICKUP MODULE AND ELECTRONIC EQUIPMENT

(71) Applicant: SONY CORPORATION, Tokyo (JP)

(72) Inventor: Shota Watanabe, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days. days.

(21) Appl. No.: 15/309,885

(22) PCT Filed: Mar. 4, 2016

(86) PCT No.: PCT/JP2016/056731
§ 371 (c)(1),
(2) Date: Nov. 9, 2016

(87) PCT Pub. No.: WO2016/147904
PCT Pub. Date: Sep. 22, 2016

(65) Prior Publication Data
US 2017/0374286 A1  Dec. 28, 2017

(30) Foreign Application Priority Data
Mar. 19, 2015  (JP) .................................. 2015-056262

(51) Int. Cl.
*H04N 5/232* (2006.01)
*H04N 5/225* (2006.01)

(52) U.S. Cl.
CPC ....... *H04N 5/23267* (2013.01); *H04N 5/2253* (2013.01); *H04N 5/23258* (2013.01)

(58) Field of Classification Search
CPC ............. H04N 5/23267; H04N 5/2253; H04N 5/23258; H04N 5/23274
See application file for complete search history.

(56) References Cited

U.S. PATENT DOCUMENTS

2006/0132631 A1* 6/2006 Yoshii .................. H04N 5/2253
  348/294
2009/0316010 A1* 12/2009 Nomura ................... G03B 5/00
  348/208.6

(Continued)

FOREIGN PATENT DOCUMENTS

JP  2006-237772 A  9/2006
JP  2008-187439 A  8/2008

(Continued)

OTHER PUBLICATIONS

International Search Report prepared by the Japan Patent Office dated May 17, 2016, for International Application No. PCT/JP2016/056731.

*Primary Examiner* — Nicholas G Giles
(74) *Attorney, Agent, or Firm* — Sheridan Ross P.C.

(57) ABSTRACT

The present disclosure relates to a solid-state image pickup element, an image pickup module and electronic equipment configured to avoid large scaling of an image pickup element caused by an improvement in functions thereof. The solid-state image pickup element is configured with a lamination of an image sensor substrate on which a plurality of pixels is arranged on a surface of a sensor, and a signal processing substrate in which signal processing of an image signal output from the image sensor substrate is executed. The signal processing substrate has an electronic blur correction processing unit, a first connection unit that connects with an optical blur correction processing unit, and a second connection unit that connects with a gyro sensor which detects a blur generated in an image. At least a part of signals passed between the gyro sensor and the optical blur correction processing unit passes through the signal processing substrate.

8 Claims, 4 Drawing Sheets

(56) References Cited

U.S. PATENT DOCUMENTS

| | | | | |
|---|---|---|---|---|
| 2010/0013939 A1* | 1/2010 | Ohno | ............... | H04N 5/2251 |
| | | | | 348/208.5 |
| 2011/0157382 A1* | 6/2011 | Miyasako | ............... | G03B 5/00 |
| | | | | 348/208.5 |
| 2015/0264265 A1* | 9/2015 | Iwata | ............... | G02B 27/0025 |
| | | | | 348/208.6 |

FOREIGN PATENT DOCUMENTS

| | | |
|---|---|---|
| JP | 2010-4370 A | 1/2010 |
| JP | 2011-139168 A | 7/2011 |

\* cited by examiner

SOLID-STATE IMAGE PICKUP ELEMENT, IMAGE PICKUP MODULE AND ELECTRONIC EQUIPMENT

CROSS REFERENCE TO RELATED APPLICATIONS

This application is a national stage application under 35 U.S.C. 371 and claims the benefit of PCT Application No PCT/JP2016/056731 having an international filing date of 4 Mar. 2016, which designated the United States, which PCT application claimed the benefit of Japanese Patent Application No. 2015-056262 filed 19 Mar. 2015, the disclosures of which are incorporated herein by reference in their entirety.

TECHNICAL FIELD

The present disclosure relates to a solid-state image pickup element, an image pickupmodule and electronic equipment, and particularly, to a solid-state image pickup element, an image pickup module, and electronic equipment which prevent large scaling of an image pickup element caused by an improvement in functions.

BACKGROUND ART

Conventionally used as blur correction processing of correcting a blur generated in an image formed by an image pickup element are blur correction processing of optically correcting blurs and blur correction processing of electronically correcting blurs. In the optical blur correction processing, processing is executed of driving, in a direction to cancel a blur, a lens configuring an optical system in which an image of a subject is formed on a surface of a sensor of an image pickup element. Additionally, in the electronic blur correction processing, processing is executed of moving an imaging region to a direction to cancel a blur, the imaging region as a range slightly narrower than a surface of a sensor of an image pickup element.

Further, an image pickup apparatus has been developed which enables an effect of correcting blurs to be improved by combining the optical blur correction processing and the electronic blur correction processing.

For example, Patent Document 1 discloses an image pickup apparatus capable of efficiently executing image blur correction by detecting an image blur signal using a gyro sensor and executing optical image blur correction processing and electronic image blur correction processing according to an amount of correction calculated on the basis of the image blur signal.

CITATION LIST

Patent Document

Patent Document 1: Japanese Patent Application Laid-Open No. 2010-4370

SUMMARY OF THE INVENTION

Problems to be Solved by the Invention

In recent years, a layered type image pickup element has been put into practical use, in which layered are an image sensor substrate with a plurality of pixels arranged on a surface of a sensor, and a signal processing substrate in which signal processing of an image signal output from the image sensor substrate is executed, so that functions of image pickup elements have been improved. For example, incorporating either one of a circuit which executes optical blur correction processing and a circuit which executes electronic blur correction processing into a signal processing substrate enables a layered image pickup element to have a blur correction function.

However, when a blur correction function is incorporated into a layered image pickup element, proposed is a configuration including a gyro sensor connected to a signal processing substrate including a circuit which executes one blur correction processing and a gyro sensor connected to a circuit which executes the other blur correction processing. Specifically, in this case, two gyro sensors are required because a configuration is proposed which includes gyro sensors for the exclusive use for a circuit which executes optical blur correction processing and a circuit which executes electronic blur correction processing, respectively. Accordingly, the number of parts is increased to increase cost, as well as increasing a scale of an image pickup module on which an image pickup element and a gyro sensor are mounted, which is a disadvantage to a trend for downsizing of electronic equipment, and therefore, it is demanded to avoid such large scaling.

The present disclosure has been made in view of such circumstances and aims at avoiding large scaling of an image pickup element caused by an improvement in functions thereof.

Solutions to Problems

A solid-state image pickup element according to one aspect of the present disclosure includes: an image sensor substrate in which a plurality of pixels is arranged on a surface of a sensor; and a signal processing substrate in which signal processing of an image signal output from the image sensor substrate is executed, wherein the signal processing substrate has a first blur correction processing unit which executes, by a first correction method, processing of correcting a blur of an image picked up in the image sensor substrate; a first connection unit that connects with a second blur correction processing unit which executes, by a second correction method, processing of correcting a blur of the image picked up in the image sensor substrate; and a second connection unit that connects with a blur detection unit which detects a blur generated in the image, and is configured to have such connection that at least a part of signals transmitted and received between the blur detection unit and the second blur correction processing unit passes through an inside of the signal processing substrate via the first connection unit and the second connection unit.

An image pickup module according to one aspect of the present disclosure includes: a solid-state image pickup element including an image sensor substrate on which a plurality of pixels is arranged on a surface of a sensor; and a signal processing substrate in which signal processing of an image signal output from the image sensor substrate is executed and which has a first blur correction processing unit that executes, by a first correction method, processing of correcting a blur of an image picked up in the image sensor substrate; a second blur correction processing unit which executes, by a second correction method, processing of correcting a blur of the image picked up in the image sensor substrate; and a blur detection unit which detects a blur generated in the image, wherein the signal processing substrate has: a first connection unit that connects with the second blur correction processing unit; and a second connection unit that connects with the blur detection unit, and is configured to have such connection that at least a part of signals transmitted and received between the blur detection unit and the second blur correction processing unit passes through an inside of the signal processing substrate via the first connection unit and the second connection unit.

Electronic equipment according to one aspect of the present disclosure includes an image pickup module, the image pickup module including: a solid-state image pickup element including an image sensor substrate in which a plurality of pixels is arranged on a surface of a sensor; and a signal processing substrate in which signal processing of an image signal output from the image sensor substrate is executed and which has a first blur correction processing unit that executes, by a first correction method, processing of correcting a blur of an image picked up in the image sensor substrate; a second blur correction processing unit which executes, by a second correction method, processing of correcting a blur of the image picked up in the image sensor substrate; and a blur detection unit which detects a blur generated in the image, wherein the signal processing substrate has: a first connection unit that connects with the second blur correction processing unit; and a second connection unit that connects with the blur detection unit, and is configured to have such connection that at least a part of signals transmitted and received between the blur detection unit and the second blur correction processing unit passes through an inside of the signal processing substrate via the first connection unit and the second connection unit.

According to one aspect of the present disclosure, a solid-state image pickup element includes an image sensor substrate in which a plurality of pixels is arranged on a surface of a sensor, and a signal processing substrate in which signal processing of an image signal output from the image sensor substrate is executed. Additionally, the signal processing substrate has a first blur correction processing unit which executes, by a first correction method, processing of correcting a blur of an image picked up in the image sensor substrate, a first connection unit that connects with a second blur correction processing unit which executes, by a second correction method, processing of correcting a blur of an image picked up in the image sensor substrate, and a second connection unit that connects with a blur detection unit which detects a blur generated in an image. Then, connection is configured such that at least a part of signals transmitted and received between the blur detection unit and the second blur correction processing unit passes through the inside of the signal processing substrate via the first connection unit and the second connection unit.

Effects of the Invention

According to one aspect of the present disclosure, large scaling of an image pickup element caused by an improvement in functions thereof can be avoided.

MODE FOR CARRYING OUT THE INVENTION

In the following, specific embodiments to which the present technology is applied will be described in detail with reference to the drawings.

Figure 1:
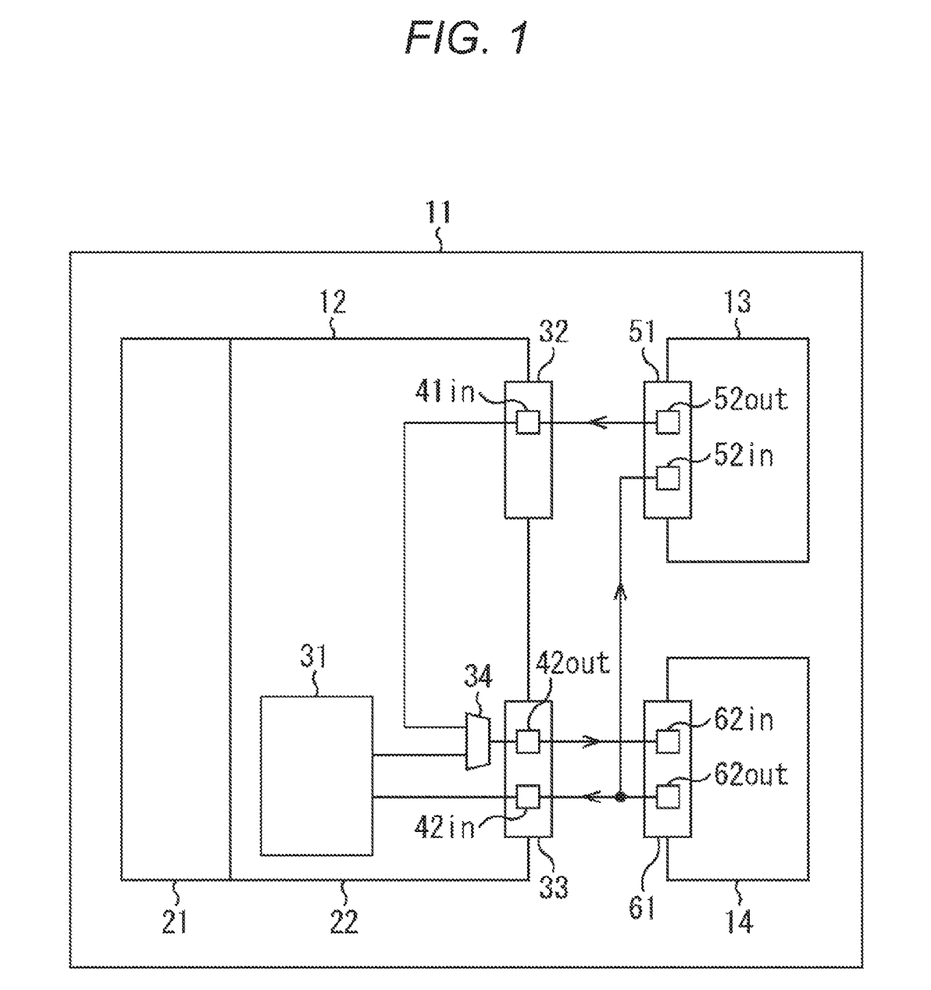
FIG. 1 is a block diagram showing a configuration example of a first embodiment of an image pickup module to which the present technology is applied.

FIG. 1 is a block diagram showing a configuration example of a first embodiment of an image pickup module to which the present technology is applied.

As shown in FIG. 1, an image pickup module 11 is configured to include a solid-state image pickup element 12, an optical blur correction processing unit 13 and a gyro sensor 14, which are mounted, for example, on one printed board.

The solid-state image pickup element 12 is configured to have an image sensor substrate 21 and a signal processing substrate 22 layered.

The image sensor substrate 21 is configured with a semiconductor substrate in which a plurality of pixels is arranged in matrix on a surface of a sensor and outputs an image signal of a picked up subject whose image is formed on the sensor surface by an optical system not shown.

The signal processing substrate 22 is, for example, bonded to the thinned image sensor substrate 21 for supporting the image sensor substrate 21 and is also electrically connected thereto to subject an image signal output from the image sensor substrate 21 to various signal processing. For example, as shown in the figure, the signal processing substrate 22 is configured to include an electronic blur correction processing unit 31, connection pads 32 and 33, and a selector 34.

The electronic blur correction processing unit 31 corrects a blur of an image picked up in the image sensor substrate 21 by an electronic correction method. For example, the electronic blur correction processing unit 31 executes correction processing of moving an imaging region on a sensor surface of the image sensor substrate 21 on the basis of a blur detection signal supplied from the gyro sensor 14 so as to cancel the blur of the image in a direction reverse to a direction of the detected blur.

The connection pads 32 and 33 are provided for connecting the signal processing substrate 22 to the outside. For example, the connection pad 32 has an input terminal 41in to which a wire through which a signal is input to the signal processing substrate 22 is connected. Additionally, the connection pad 33 has an input terminal 42in to which a wire through which a signal is input to the signal processing substrate 22 is connected and an output terminal 42out to which a wire through which a signal is output from the signal processing substrate 22 is connected. Additionally, the output terminal 42out is commonly used by an output from the optical blur correction processing unit 13 to the gyro sensor 14 and an output from the electronic blur correction processing unit 31 to the gyro sensor 14.

The selector 34 switches a wire for exclusively selecting a signal to be output from the signal processing substrate 22 via the output terminal 42out of the connection pad 33. For example, the selector 34 exclusively selects either one of a signal output from the electronic blur correction processing unit 31 and a signal output from the optical blur correction processing unit 13 and outputs the same from the signal processing substrate 22.

The optical blur correction processing unit 13 corrects a blur of an image picked up by the solid-state image pickup element 12 by an optical correction method. For example, the optical blur correction processing unit 13 executes correction processing of driving a lens (not shown) provided in an optical system in which an image of a subject is formed so as to cancel a blur in a direction reverse to a direction of the detected blur on the basis of the blur detection signal supplied from the gyro sensor 14.

Additionally, the optical blur correction processing unit 13 is provided with a connection pad 51 for external connection. For example, the connection pad 51 has an input terminal 52in to which a wire through which a signal is input to the optical blur correction processing unit 13 is connected and an output terminal 52out to which a wire through which a signal is output from the optical blur correction processing unit 13 is connected.

The gyro sensor 14 is configured with, for example, an acceleration sensor for detecting acceleration, and an angular speed sensor for detecting an angular speed or the like. For example, the gyro sensor 14 outputs the blur detection signal indicating a direction or a size of a blur generated in an image picked up in the image sensor substrate 21 by detecting blurs of the image pickup module 11 as a whole.

Additionally, the gyro sensor 14 is provided with a connection pad 61 for external connection. For example, the connection pad 61 has an input terminal 62in to which a wire through which a signal is input to the gyro sensor 14 is connected and an output terminal 62out to which a wire through which a signal is output from the gyro sensor 14 is connected.

Such solid-state image pickup element 12, optical blur correction processing unit 13 and gyro sensor 14 as described above are mounted on a printed board to configure the image pickup module 11 and are connected with each other on the printed board via wires.

For example, as shown in the figure, the input terminal 41in of the signal processing substrate 22 and the output terminal 52out of the optical blur correction processing unit 13 are connected, and the output terminal 42out of the signal processing substrate 22 and the input terminal 62in of the gyro sensor 14 are connected. Additionally, the input terminal 42in of the signal processing substrate 22 and the input terminal 52in of the optical blur correction processing unit 13, and the output terminal 62out of the gyro sensor 14 are connected.

Additionally, within the signal processing substrate 22, the electronic blur correction processing unit 31 is connected to the input terminal 42in and also to the output terminal 42out via the selector 34. Further, within the signal processing substrate 22, the input terminal 41in is connected to the output terminal 42out via the selector 34. Accordingly, the output terminal 52out of the optical blur correction processing unit 13 and the input terminal 62in of the gyro sensor 14 are configured to be connected to each other after passing through the inside of the signal processing substrate 22.

In thus configured image pickup module 11, a request signal for requesting the blur detection signal from the electronic blur correction processing unit 31 is output from the output terminal 42out via the selector 34 and then input to the gyro sensor 14 through the input terminal 62in. Then, according to the request, the blur detection signal output by the gyro sensor 14 is output from the output terminal 62out and supplied to the electronic blur correction processing unit 31 via the input terminal 42in.

Additionally, the request signal requesting the blur detection signal from the optical blur correction processing unit 13 is output from the output terminal 52out and input to the inside of the signal processing substrate 22 through the input terminal 41in, then output from the output terminal 42out via the selector 34 and input to the gyro sensor 14 from the input terminal 62in. Specifically, the request signal output from the optical blur correction processing unit 13 will be supplied to the gyro sensor 14 via the signal processing substrate 22. Then, according to the request, the blur detection signal output by the gyro sensor 14 is output from the output terminal 62out and supplied to the optical blur correction processing unit 13 via the input terminal 52in.

It should be noted that while the blur detection signal output from the gyro sensor 14 is simultaneously supplied to the optical blur correction processing unit 13 and to the electronic blur correction processing unit 31, the optical blur correction processing unit 13 and the electronic blur correction processing unit 31 execute the blur correction processing while ignoring other signals than the blur detection signal supplied in response to their own requests.

Additionally, the signal processing substrate 22 is configured such that either one of a request signal output from the optical blur correction processing unit 13 and a request signal output from the electronic blur correction processing unit 31 is selected and output by the selector 34. This prevents simultaneous supply of two request signals to the gyro sensor 14.

Thus, in the image pickup module 11, supply of the request signal of the optical blur correction processing unit 13 to the gyro sensor 14 after passing through the inside of the signal processing substrate 22 allows the optical blur correction processing unit 13 and the electronic blur correction processing unit 31 to share one gyro sensor 14. This enables a size of the image pickup module 11 to be smaller than, for example, that of a configuration in which gyro sensors 14 are provided for the exclusive use for the optical blur correction processing unit 13 and the electronic blur correction processing unit 31, respectively. In other words, it is possible to avoid large scaling of the image pickup module 11 as a whole which is caused by improving the functions of the solid-state image pickup element 12 to have an electronic blur correction function.

Additionally, for example, a configuration in which the request signal of the optical blur correction processing unit 13 is supplied to the gyro sensor 14 without passing through the inside of the signal processing substrate 22 requires a bus switch to be provided on the printed board in place of the selector 34. As a result, an area of the image pickup module 11 is increased as the bus switch is mounted. In other words, the image pickup module 11 can be reduced in size as a whole by a configuration in which the selector 34 is provided within the signal processing substrate 22.

Further, such a semiconductor part as the selector 34 can be formed in the signal processing substrate 22 by using latest techniques, and designing which allows high speed driving enables reduction in a transmission delay of a signal which is caused by passing through the inside of the signal processing substrate 22.

Figure 2:
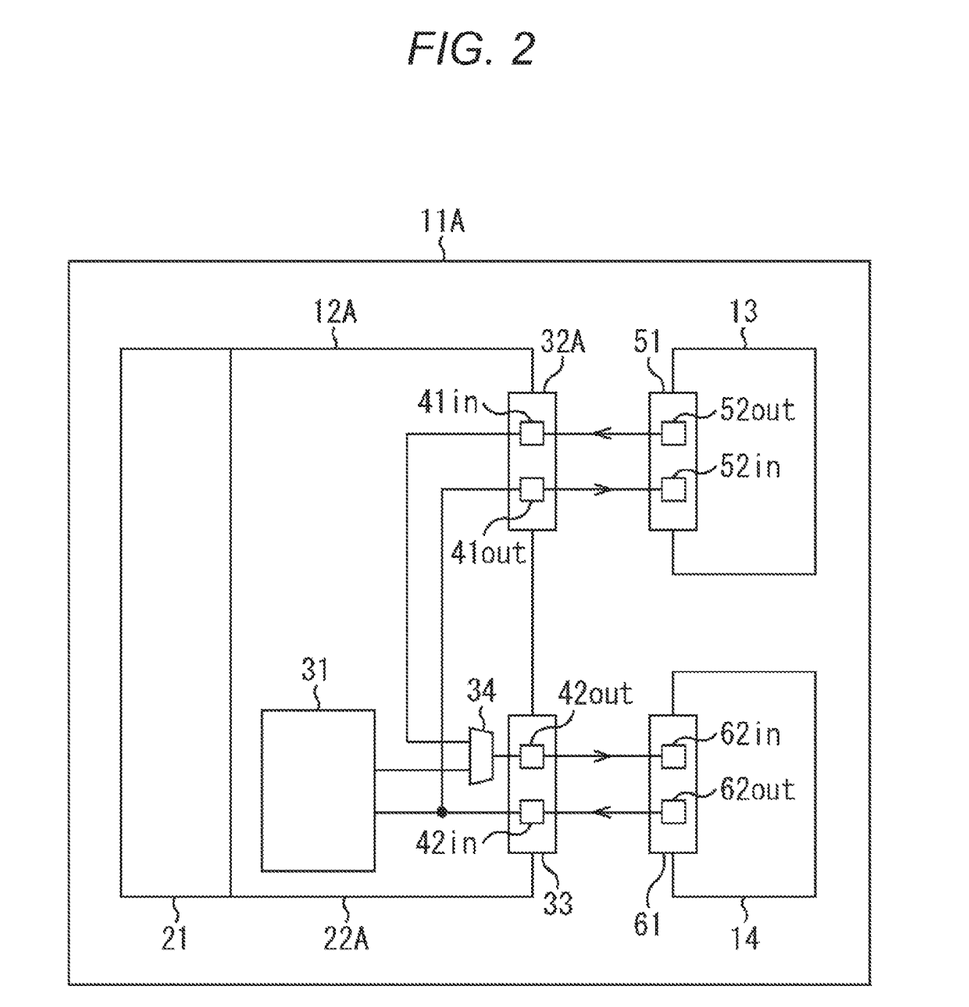
FIG. 2 is a block diagram showing a configuration example of a second embodiment of the image pickup module.

Next, FIG. 2 is a block diagram showing a configuration example of a second embodiment of the image pickup module 11.

It should be noted that in an image pickup module 11A shown in FIG. 2, blocks common to those of the image pickup module 11 in FIG. 1 are identified by the same reference characters to omit description thereof. Specifically, while the image pickup module 11A is common to the image pickup module 11 in FIG. 1 in including the optical blur correction processing unit 13 and the gyro sensor 14, a solid-state image pickup element 12A has a different configuration from the solid-state image pickup element 12 in FIG. 1.

The solid-state image pickup element 12A is configured to have the image sensor substrate 21 and a signal processing substrate 22A layered, in which a connection pad 32A of the signal processing substrate 22A has the input terminal 41in and an output terminal 41out.

The output terminal 41out, to which a wire through which a signal from the signal processing substrate 22 is output is connected, is connected to the input terminal 52in of the optical blur correction processing unit 13. Additionally, the output terminal 41out is connected to a wire which connects the electronic blur correction processing unit 31 and the input terminal 42in inside the solid-state image pickup element 12A. Specifically, connection is configured such that a signal input from the input terminal 42in is branched inside the signal processing substrate 22 and supplied to the electronic blur correction processing unit 31, as well as being output from the output terminal 41out and supplied to the optical blur correction processing unit 13.

As a result, the image pickup module 11A has a connection configuration such that the blur detection signal output from the gyro sensor 14 is supplied to the optical blur correction processing unit 13 after passing through the inside of the signal processing substrate 22A. Specifically, the blur detection signal output from the gyro sensor 14, after being output from the output terminal 62out and input to the inside of the signal processing substrate 22 through the input terminal 42in, is output through the output terminal 41out and input to the optical blur correction processing unit 13 through the input terminal 52in.

Thus, the image pickup module 11A is configured such that both the request signal supplied from the optical blur correction processing unit 13 to the gyro sensor 14 and the blur detection signal supplied from the gyro sensor 14 to the optical blur correction processing unit 13 pass through the inside of the signal processing substrate 22A.

Accordingly, similarly to the image pickup module 11 in FIG. 1, the image pickup module 11A is allowed to avoid large scaling as a whole.

Figure 3:
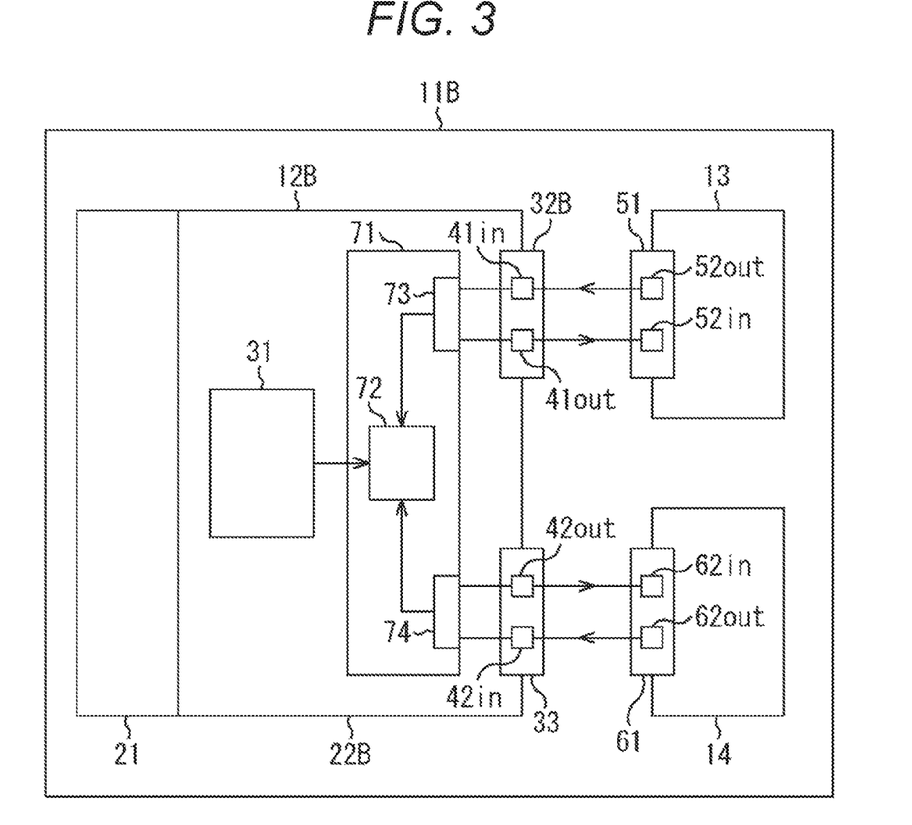
FIG. 3 is a block diagram showing a configuration example of a third embodiment of the image pickup module.

Next, FIG. 3 is a block diagram showing a configuration example of a third embodiment of the image pickup module 11.

It should be noted that in the image pickup module 11B shown in FIG. 3, blocks common to those of the image pickup module 11 in FIG. 1 are identified by the same reference characters to omit description thereof. Specifically, while the image pickup module 11B is common to the image pickup module 11 in FIG. 1 in including the optical blur correction processing unit 13 and the gyro sensor 14, a solid-state image pickup element 12B has a different configuration from the solid-state image pickup element 12 in FIG. 1.

The solid-state image pickup element 12B is configured to have the image sensor substrate 21 and a signal processing substrate 22B layered. The signal processing substrate 22B has the electronic blur correction processing unit 31, a connection pad 32B having the input terminal 41in and the output terminal 41out, the connection pad 33 having the input terminal 42in and the output terminal 42out, and a data buffer 71.

Additionally, the input terminal 41in of the signal processing substrate 22B and the output terminal 52out of the optical blur correction processing unit 13 are connected, and the output terminal 41out of the signal processing substrate 22B and the input terminal 52in of the optical blur correction processing unit 13 are connected. Additionally, the input terminal 42in of the signal processing substrate 22B and the output terminal 62out of the gyro sensor 14 are connected and the output terminal 42out of the signal processing substrate 22B and the input terminal 62in of the gyro sensor 14 are connected.

The data buffer 71 has a memory unit 72, and interfaces 73 and 74.

The memory unit 72 is configured with, for example, a random access memory (RAM) and temporarily stores data (a numerical value of a direction or a size of a blur) of the blur detection signal output from the gyro sensor 14. Additionally, the data of the blur detection signal stored in the memory unit 72 is updated by data of a new blur detection signal output from the gyro sensor 14 when required. For example, the electronic blur correction processing unit 31 is capable of directly reading data of the blur detection signal stored in the memory unit 72.

The interface 73 executes processing of transmitting and receiving a signal to/from the optical blur correction processing unit 13 via the connection pad 32B and the connection pad 51. For example, the interface 73 reads data of the blur detection signal stored in the memory unit 72 and supplies the same to the optical blur correction processing unit 13 according to the request signal from the optical blur correction processing unit 13.

The interface 74 executes processing of transmitting and receiving a signal to/from the gyro sensor 14 via the connection pad 33 and the connection pad 61 and for example, writes data of the blur detection signal output from the gyro sensor 14 into the memory unit 72.

This leads to a configuration of the image pickup module 11B in which the optical blur correction processing unit 13 and the electronic blur correction processing unit 31 are allowed to independently execute reading of data of the blur detection signal stored in the memory unit 72.

Thus configured image pickup module 11B avoids large scaling as a whole similarly to the image pickup module 11 in FIG. 1. Further, in the image pickup module 11B, by making the memory unit 72 store data of the blur detection signal output from the gyro sensor 14, the optical blur correction processing unit 13 and the electronic blur correction processing unit 31 are allowed to simultaneously (not exclusively) read data of the blur detection signal.

It should be noted that in the image pickup module 11, for example, the input terminal 42in and the output terminal 42out provided in the connection pad 33 of the signal processing substrate 22 are respectively provided as many as required according to a standard of communication executed between the signal processing substrate 22 and the gyro sensor 14. Additionally, this is also the case with the connection pad 32 of the signal processing substrate 22, the connection pad 51 of the optical blur correction processing unit 13, and the connection pad 61 of the gyro sensor 14.

Additionally, other than the above-described configuration, the image pickup module 11 may be configured such that, for example, the optical blur correction processing unit 13 is incorporated in the signal processing substrate 22 and the electronic blur correction processing unit 31 is mounted on the printed board of the image pickup module 11. In other words, the present technologies is applicable to a configuration in which at least one of the optical blur correction processing unit 13 and the electronic blur correction processing unit 31 is incorporated into the signal processing substrate 22.

It should be noted that the image pickup module 11 of each of the above-described embodiments is applicable to various kinds of electronic equipment, for example, an imaging system such as a digital still camera or a digital video camera, a portable telephone set having an imaging function or other equipment having an imaging function.

Figure 4:
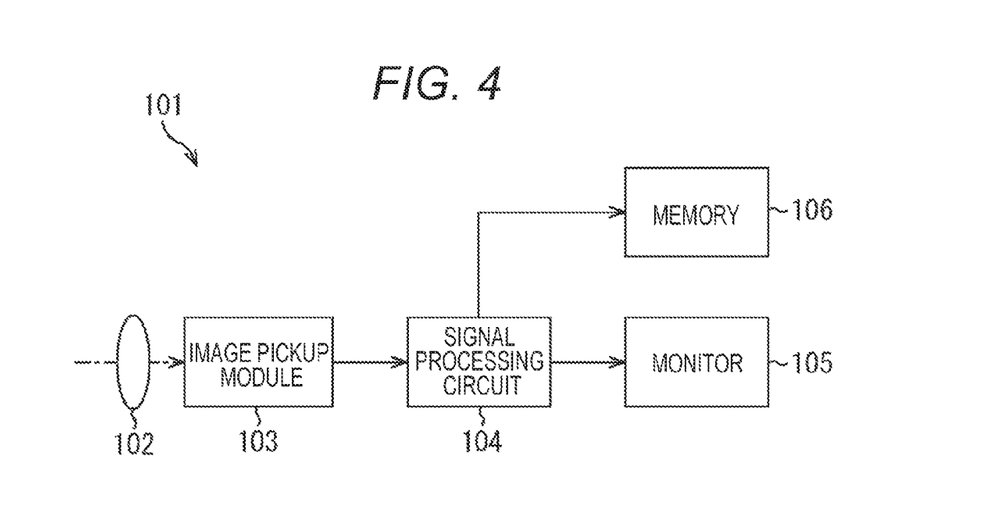
FIG. 4 is a block diagram showing a configuration example of one embodiment of an image pickup apparatus to which the present technology is applied.

FIG. 4 is a block diagram showing a configuration example of the image pickup module 11 to be mounted on electronic equipment.

As shown in FIG. 4, an image pickup apparatus 101 is configured to include an optical system 102, an image pickup module 103, a signal processing circuit 104, a monitor 105, and a memory 106, and is capable of picking up a still image and a moving image.

The optical system 102 is configured to have one or a plurality of lenses and directs an image light (incident light) from a subject to the image pickup module 103 to form an image on a light receiving surface (sensor unit) of the image pickup module 103. Additionally, the optical system 102 is provided with a drive unit which drives a lens for correcting a blur of an image by the optical blur correction processing unit 13.

As the image pickup module 103, the image pickup module 11 of each of the above-described embodiments is applied. In the image pickup module 103, electrons are accumulated in pixels for a predetermined time period according to an image formed on the sensor surface via the optical system 102. Then, a signal according to electrons accumulated in the pixels is supplied from the image pickup module 11 to the signal processing circuit 104.

The signal processing circuit 104 subjects an image signal output from the image pickup module 103 to various kinds of signal processing (e.g. white balance adjustment processing, gamma correction processing, or the like). The image obtained by executing the signal processing by the signal processing circuit 104 is supplied to the monitor 105 and displayed or supplied to the memory 106 and stored (recorded).

By applying the image pickup module 11 of each of the above-described embodiments, thus configured image pickup apparatus 101 is allowed to have improved functions and a reduced size.

Figure 5:
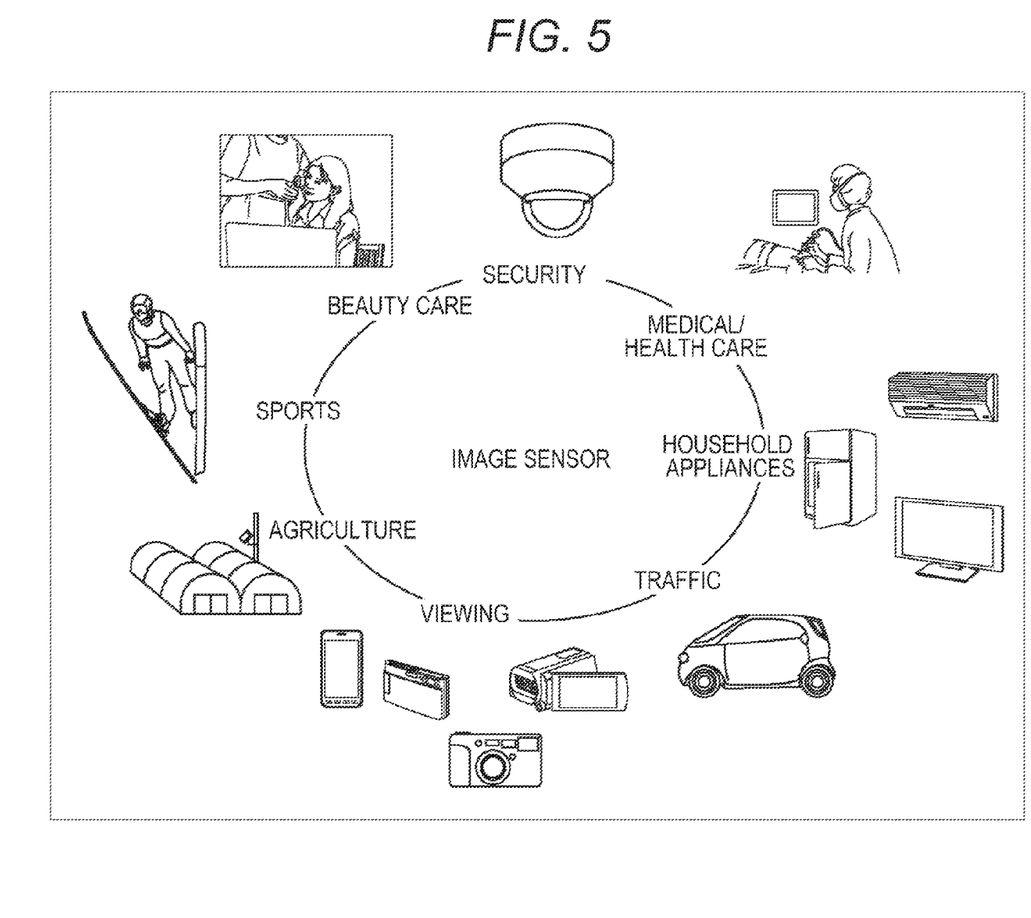
FIG. 5 is a diagram showing an example of use of an image sensor.

FIG. 5 is a diagram showing an example of use of the above-described image pickup module 11 (image sensor).

The above-described image sensor can be used, for example, in the following various cases of sensing light such as visible light, infrared light, ultraviolet light, X-rays or the like.

- Devices for photographing images for viewing, such as a digital camera, portable equipment with a camera function, and the like.
- Devices for traffic use, such as a vehicle-mounting sensor which photographs the front and rear, surroundings and the inside of a car or the like for the purpose of safety driving such as automatic stop, and for the purpose of recognition of a driver's condition, a monitoring camera which monitors traveling vehicles and roads, a distance sensor which measures a distance between vehicles, and the like.
- Devices for use in such household appliances as a TV set, a refrigerator, an air conditioner and the like for the purpose of photographing a user's gesture to conduct equipment operation according to the gesture.
- Devices for medical/health care, such as an endoscope, a device which conducts blood vessel photographing with a received infrared light, and the like.
- Devices for security use such as a monitoring camera for crime prevention, a camera for person identification, and the like.
- Devices for beauty care such as a skin sensor for photographing a skin, a microscope for photographing a scalp, and the like.
- Devices for sport use such as an action camera, a wearable camera and the like for use in sports.
- Devices for agricultural use such as a camera for monitoring conditions of fields and farm products, and the like.

It should be noted that the present technology can take the fowling configurations as well.

(1)

A solid-state image pickup element including:

an image sensor substrate in which a plurality of pixels is arranged on a surface of a sensor; and a signal processing substrate in which signal processing of an image signal output from the image sensor substrate is executed, in which the signal processing substrate has:

a first blur correction processing unit which executes, by a first correction method, processing of correcting a blur of an image picked up in the image sensor substrate;

a first connection unit that connects with a second blur correction processing unit which executes, by a second correction method, processing of correcting a blur of the image picked up in the image sensor substrate; and a second connection unit that connects with a blur detection unit which detects a blur generated in the image, and is configured to have such connection that at least a part of signals transmitted and received between the blur detection unit and the second blur correction processing unit passes through the inside of the signal processing substrate.

(2)

The solid-state image pickup element according to (1), wherein the first connection unit has an input terminal through which a signal to be supplied from the second blur correction processing unit to the blur detection unit is input, and a signal input through the input terminal is supplied to the blur detection unit via the second connection unit after passing through the inside of the signal processing substrate.

(3)

The solid-state image pickup element according to (1) or (2), wherein the second connection unit has an output terminal commonly used by an output of a signal to be supplied from the first blur correction processing unit to the blur detection unit and an output of a signal to be supplied from the second blur correction processing unit to the blur detection unit after passing through the inside of the signal processing substrate, and the signal processing substrate further has a selection unit which exclusively selects a signal output from the output terminal.

(4)

The solid-state image pickup element according to any of (1) to (3), which is configured to have such connection that a signal output from the blur detection unit and input to the signal processing substrate via the second connection unit is branched inside the signal processing substrate and supplied to the first blur correction processing unit, as well as being supplied to the second blur correction processing unit via the first connection unit.

(5)

The solid-state image pickup element according to (1), wherein the signal processing substrate further has a memory unit which temporarily holds data of a signal output from the blur detection unit, and the first blur correction processing unit and the second blur correction processing unit respectively read the data held in the memory unit.

(6)

The solid-state image pickup element according to any of (1) to (5), wherein the first blur correction processing unit corrects a blur of the image by a correction method of moving an imaging region on the sensor surface of the image sensor substrate, and the second blur correction processing unit corrects a blur of the image by a correction method of driving an optical system which forms an image of a subject on the sensor surface of the image sensor substrate.

(7)

An image pickup module including:

a solid-state image pickup element including an image sensor substrate in which a plurality of pixels is arranged on a surface of a sensor; and a signal processing substrate in which signal processing of an image signal output from the image sensor substrate is executed and which has a first blur correction processing unit that executes, by a first correction method, processing of correcting a blur of an image picked up in the image sensor substrate;

a second blur correction processing unit which executes, by a second correction method, processing of correcting a blur of the image picked up in the image sensor substrate; and a blur detection unit which detects a blur generated in the image, in which the signal processing substrate has:

a first connection unit that connects with the second blur correction processing unit; and a second connection unit that connects with the blur detection unit, and is configured to have such connection that at least a part of signals transmitted and received between the blur detection unit and the second blur correction processing unit passes through the inside of the signal processing substrate.

(8)

Electronic equipment including an image pickup module, the image pickup module including:

a solid-state image pickup element including an image sensor substrate in which a plurality of pixels is arranged on a surface of a sensor; and a signal processing substrate in which signal processing of an image signal output from the image sensor substrate is executed and which has a first blur correction processing unit that executes, by a first correction method, processing of correcting a blur of an image picked up in the image sensor substrate;

a second blur correction processing unit which executes, by a second correction method, processing of correcting a blur of the image picked up in the image sensor substrate; and a blur detection unit which detects a blur generated in the image, in which the signal processing substrate has:

a first connection unit that connects with the second blur correction processing unit; and a second connection unit that connects with the blur detection unit, and is configured to have such connection that at least a part of signals transmitted and received between the blur detection unit and the second blur correction processing unit passes through the inside of the signal processing substrate.

It should be noted that the embodiments of the present disclosure are not limited to the above-described embodiments, and various modifications may be made without departing from the scope of the present disclosure.

REFERENCE SIGNS LIST

11 Image pickup module
12 Solid-state image pickup element
13 Optical blur correction processing unit
14 Gyro sensor
21 Image sensor substrate
22 Signal processing substrate
31 Electronic blur correction processing unit
32 and 33 Connection pad
34 Selector
41in Input terminal
42in Input terminal
42out Output terminal
51 Connection pad
52in Input terminal
52out Output terminal
61 Connection pad
62in Input terminal
62out Output terminal
71 Data buffer
72 Memory unit
73 and 74 Interface

What is claimed is:

1. A solid-state image pickup element comprising:

an image sensor substrate in which a plurality of pixels is arranged on a surface of a sensor; and a signal processing substrate in which signal processing of an image signal output from the image sensor substrate is executed, wherein the signal processing substrate has a first blur correction processing unit which executes, by a first correction method, processing of correcting a blur of an image picked up in the image sensor substrate;

a first connection unit that connects with a second blur correction processing unit which executes, by a second correction method, processing of correcting a blur of the image picked up in the image sensor substrate; and a second connection unit that connects with a blur detection unit which detects a blur generated in the image, and is configured to have such connection that at least a part of signals transmitted and received between the blur detection unit and the second blur correction processing unit passes through an inside of the signal processing substrate via the first connection unit and the second connection unit.

2. The solid-state image pickup element according to claim 1, wherein the first connection unit has an input terminal through which a signal to be supplied from the second blur correction processing unit to the blur detection unit is input, and a signal input through the input terminal is supplied to the blur detection unit via the second connection unit after passing through the inside of the signal processing substrate.

3. The solid-state image pickup element according to claim 1,
wherein the second connection unit has an output terminal commonly used by an output of a signal to be supplied from the first blur correction processing unit to the blur detection unit and an output of a signal to be supplied from the second blur correction processing unit to the blur detection unit after passing through the inside of the signal processing substrate, and
the signal processing substrate further has a selection unit which exclusively selects a signal output from the output terminal.

4. The solid-state image pickup element according to claim 1, which is configured to have such connection that a signal output from the blur detection unit and input to the signal processing substrate via the second connection unit is branched inside the signal processing substrate and supplied to the first blur correction processing unit, as well as being supplied to the second blur correction processing unit via the first connection unit.

5. The solid-state image pickup element according to claim 1,
wherein the signal processing substrate further has a memory unit which temporarily holds data of a signal output from the blur detection unit, and
the first blur correction processing unit and the second blur correction processing unit respectively read the data held in the memory unit.

6. The solid-state image pickup element according to claim 1,
wherein the first blur correction processing unit corrects a blur of the image by a correction method of moving an imaging region on the sensor surface of the image sensor substrate, and
the second blur correction processing unit corrects a blur of the image by a correction method of driving an optical system which forms an image of a subject on the sensor surface of the image sensor substrate.

7. An image pickup module comprising:
a solid-state image pickup element including an image sensor substrate on which a plurality of pixels is arranged on a surface of a sensor; and a signal processing substrate in which signal processing of an image signal output from the image sensor substrate is executed and which has a first blur correction processing unit that executes, by a first correction method, processing of correcting a blur of an image picked up in the image sensor substrate;
a second blur correction processing unit which executes, by a second correction method, processing of correcting a blur of the image picked up in the image sensor substrate; and
a blur detection unit which detects a blur generated in the image,
wherein the signal processing substrate has:
a first connection unit that connects with the second blur correction processing unit; and
a second connection unit that connects with the blur detection unit, and
is configured to have such connection that at least a part of signals transmitted and received between the blur detection unit and the second blur correction processing unit passes through an inside of the signal processing substrate via the first connection unit and the second connection unit.

8. Electronic equipment comprising an image pickup module, the image pickup module including:
a solid-state image pickup element including an image sensor substrate in which a plurality of pixels is arranged on a surface of a sensor; and a signal processing substrate in which signal processing of an image signal output from the image sensor substrate is executed and which has a first blur correction processing unit that executes, by a first correction method, processing of correcting a blur of an image picked up in the image sensor substrate;
a second blur correction processing unit which executes, by a second correction method, processing of correcting a blur of the image picked up in the image sensor substrate; and
a blur detection unit which detects a blur generated in the image,
wherein the signal processing substrate has:
a first connection unit that connects with the second blur correction processing unit; and
a second connection unit that connects with the blur detection unit, and
is configured to have such connection that at least a part of signals transmitted and received between the blur detection unit and the second blur correction processing unit passes through an inside of the signal processing substrate via the first connection unit and the second connection unit.

* * * * *